(12) United States Patent
Miyasaka et al.

(10) Patent No.: US 8,769,170 B2
(45) Date of Patent: Jul. 1, 2014

(54) ELECTRONIC DEVICE, CONTROL METHOD FOR AN ELECTRONIC DEVICE, AND RECORDING MEDIUM

(75) Inventors: Masayo Miyasaka, Shiojiri (JP); Hidetoshi Masuda, Kitakyushu (JP)

(73) Assignee: Seiko Epson Corporation, Tokyo (JP)

( * ) Notice: Subject to any disclaimer, the term of this patent is extended or adjusted under 35 U.S.C. 154(b) by 460 days.

(21) Appl. No.: 13/234,396

(22) Filed: Sep. 16, 2011

(65) Prior Publication Data

US 2012/0099145 A1 Apr. 26, 2012

(30) Foreign Application Priority Data

Sep. 16, 2010 (JP) ................................ 2010-207545

(51) Int. Cl.
*G06F 3/00* (2006.01)
*G06F 5/00* (2006.01)
(52) U.S. Cl.
USPC ................................. 710/57; 710/52; 710/53
(58) Field of Classification Search
USPC .............................................. 710/52, 53, 57
See application file for complete search history.

(56) References Cited

U.S. PATENT DOCUMENTS

| | | | |
|---|---|---|---|
| 5,594,653 A | 1/1997 | Akiyama et al. | |
| 6,198,985 B1 | 3/2001 | Miyasaka et al. | |
| 6,205,363 B1 | 3/2001 | Miyasaka et al. | |
| 6,208,906 B1 | 3/2001 | Miyasaka et al. | |
| 6,360,135 B1 | 3/2002 | Miyasaka et al. | |
| 6,362,896 B1 | 3/2002 | Miyasaka et al. | |
| 6,434,445 B2 | 8/2002 | Miyasaka et al. | |
| 6,453,208 B2 * | 9/2002 | Miyasaka et al. | ............... 700/79 |
| 6,697,678 B2 | 2/2004 | Miyasaka et al. | |
| 6,975,423 B2 | 12/2005 | Koakutsu et al. | |
| 2003/0115355 A1 * | 6/2003 | Cometto et al. | ............. 709/234 |
| 2004/0263905 A1 * | 12/2004 | Okuyama | ................... 358/1.16 |

FOREIGN PATENT DOCUMENTS

| | | |
|---|---|---|
| JP | 06-262809 A | 9/1994 |
| JP | 07-186494 A | 7/1995 |
| JP | 11-168506 A | 6/1999 |
| JP | 2001-260435 A | 9/2001 |

\* cited by examiner

*Primary Examiner* — Farley Abad
(74) *Attorney, Agent, or Firm* — Nutter McClennen & Fish LLP; John J. Penny, V.

(57) ABSTRACT

Managing commands that have not been executed is simplified while maintaining a state in which real-time commands can be executed. A printer 2 has a write control unit 21A that writes received commands to a receive buffer 31, a command execution unit 21B that executes the written commands, and a real-time command execution unit 21C that executes written commands that are real-time commands. The printer 2 enters a full-buffer mode as needed by the capacity of available storage space in the receive buffer 31, and when in the full-buffer mode the write control unit 21A cyclically writes commands to an auxiliary space created in the receive buffer, and the real-time command execution unit 21C reads and executes real-time commands from the auxiliary space.

14 Claims, 8 Drawing Sheets

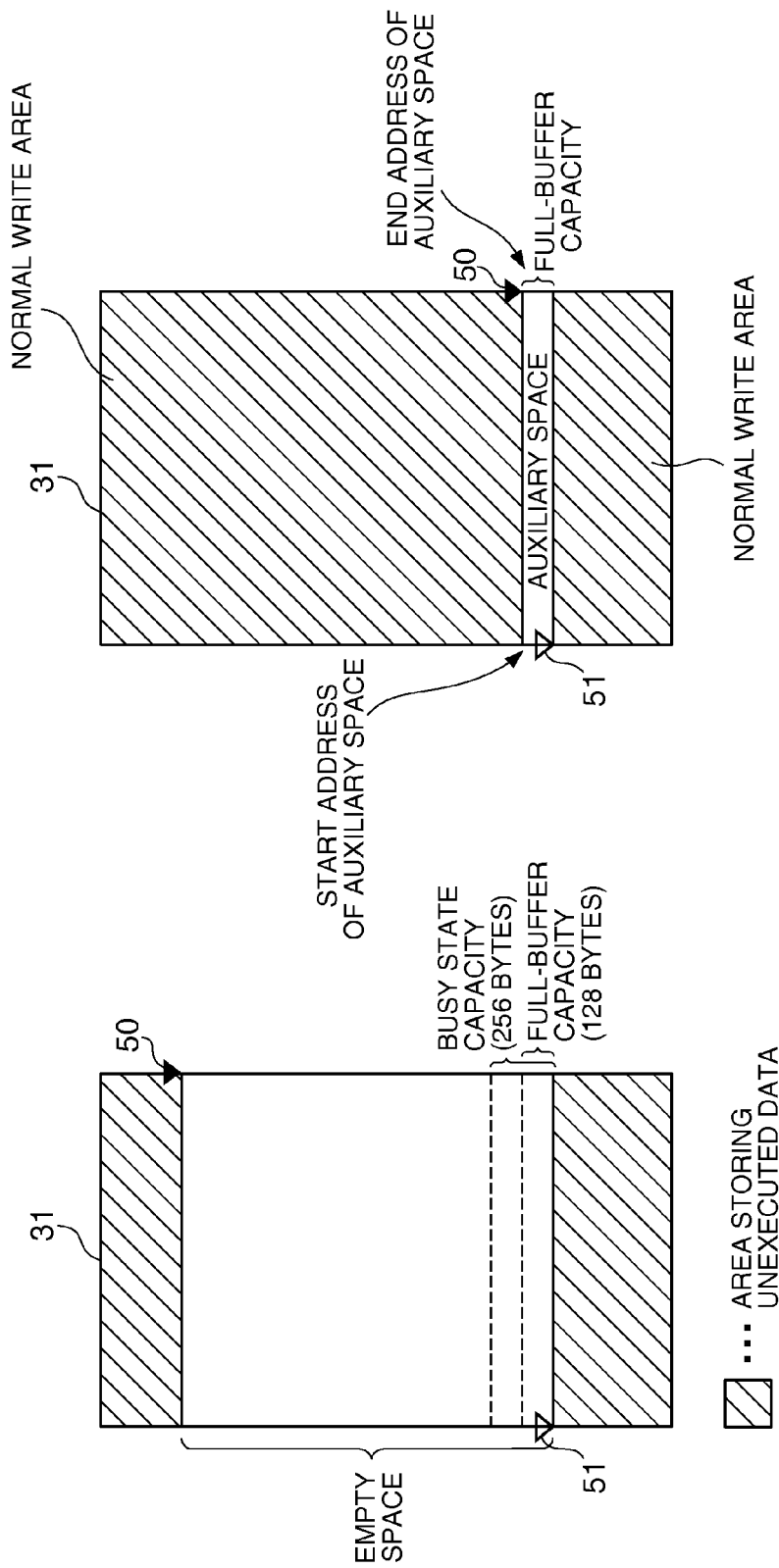

ELECTRONIC DEVICE, CONTROL METHOD FOR AN ELECTRONIC DEVICE, AND RECORDING MEDIUM

Priority is claimed under 35 U.S.C. 119 to Japanese Patent Application No. JP 2010-207545 filed on Sep. 16, 2010, which is hereby incorporated by reference in its entirety.

BACKGROUND

1. Technical Field

The present invention relates to an electronic device that receives commands from a host computer, to a control method for the electronic device, and to a recording medium that records a program for controlling the electronic device.

2. Related Art

Electronic devices that operate according to commands sent from a host computer as a host device are known from the literature. See, for example, Japanese Unexamined Patent Appl. Pub. JP-A-2001-260435. In addition to normal operating commands, the commands received by such electronic devices from the host computer include real-time commands that require immediate execution, such as reset commands and commands telling the electronic device to return status information.

When a real-time command is input, this type of electronic device must immediately execute the process called by the real-time command regardless of whether or not another job is already queued. This means that commands must be managed appropriately so that any real-time command can be executed immediately even when the buffer used to temporarily store commands is full. Command management therefore tends to become complicated because commands that have not been executed must still be managed even after satisfying the need to maintain a state in which real-time commands can be executed.

SUMMARY

The invention enables easily managing unexecuted commands while maintaining a state in which real-time commands can be executed.

A first aspect of the invention is an electronic device having a write control unit that cyclically writes commands received from a host computer in the order received to a receive buffer; a command execution unit that reads and executes commands written to the receive buffer in the order written; and a real-time command execution unit that detects real-time commands in the order written from among commands written to the receive buffer, and sequentially reads and executes detected real-time commands. The electronic device goes from a normal mode to a full-buffer mode when the capacity of empty space in which received commands can be written and which is formed in the receive buffer after executing a command reaches a first reference value or less, and remains in the full-buffer mode until the capacity of the empty space increases to a second reference value that is greater than the first reference value. While in the full-buffer mode, the write control unit cyclically writes the received commands to an auxiliary space that is formed in the receive buffer, and the real-time command execution unit detects real-time commands in the order written from among the commands written to the auxiliary space, and reads and executes the detected real-time commands.

Even when the receive buffer is in a full-buffer state in which the empty storage space is less than or equal to a first reference value, this aspect of the invention cyclically writes and executes real-time commands from a limited area called an auxiliary space formed in an area in the same receive buffer by using addresses in a ring. As a result, the full-buffer state of the receive buffer can be eliminated while maintaining a state in which processes related to real-time commands can be continuously executed. More particularly, because the auxiliary space is an area created in the receive buffer, address management is simple and the processing time is shortened. The command management process is also simplified because managing commands in the auxiliary space after the full-buffer mode is enabled and managing commands before entering the full-buffer mode are part of the same continuous operation. Note that a normal mode as used herein is a mode in which the command execution unit executes received commands, and the full-buffer mode is a mode in which the command execution unit cannot execute received commands. In both modes, the real-time command execution unit executes real-time commands with priority over other commands.

In an electronic device according to another aspect of the invention preferably, the write control unit stops cyclically writing commands to the auxiliary space and starts writing the received commands to the empty space when the normal mode is resumed from the full-buffer mode because the empty space capacity increased to the second reference value or more.

This aspect of the invention returns from the full-buffer mode to the normal mode when the capacity of the empty space (the available storage capacity) is greater than the second reference value and has sufficient extra capacity, and normal writing using the receive buffer can start quickly. More specifically, because the auxiliary space is an area created in the receive buffer, normal command management using the receive buffer after the full-buffer mode is cancelled can be performed without interruption in unison with command management while in the full-buffer mode, address management is therefore simple and the command management process is simple.

Further preferably in an electronic device according to another aspect of the invention, the write control unit writes the received commands to the area indicated by the write pointer while moving the write pointer in the auxiliary space, and the real-time command execution unit detects an area where a real-time command was written and reads and executes the detected real-time command while moving the real-time command read pointer in the auxiliary space, when in the full-buffer mode; and when the write pointer and the real-time command read pointer point to the same area, the write control unit moves the write pointer to the beginning of the auxiliary space, and the real-time command execution unit moves the real-time command read pointer to the beginning of the auxiliary space.

The write pointer and the real-time command read pointer do not always move completely independently in the auxiliary space in this aspect of the invention, and by managing movement of these pointers again from the beginning of the auxiliary space starting when these pointers point to the same place, the starting position of pointer movement when these pointers point to the same area is always set to the beginning of the auxiliary space, and the process related to managing these pointers is simple.

In an electronic device according to another aspect of the invention, the auxiliary space moves cyclically in the receive buffer as commands are executed, is an area of a capacity corresponding to empty space formed in the receive buffer when entering the full-buffer mode, and is an area of a capacity corresponding to the first reference value.

This aspect of the invention uses empty space to assure an area equal to this auxiliary space in the receive buffer.

An electronic device according to another aspect of the invention preferably also has an interface unit. When the full-buffer mode is enabled, the interface unit reports to the host computer that the full-buffer mode was enabled, and the command execution unit stops reading and executing the received commands.

This aspect of the invention enables the host computer to know when the full-buffer mode is enabled, and as a result can execute a process appropriate to the full-buffer mode, such as limiting output of commands. As a result, the electronic device can stop executing commands other than real-time commands.

Another aspect of the invention is a control method for an electronic device having a write control unit that cyclically writes commands received from a host computer in the order received to a receive buffer, a command execution unit that reads and executes commands written to the receive buffer in the order written, and a real-time command execution unit that detects real-time commands in the order written from among commands written to the receive buffer, and sequentially reads and executes detected real-time commands, wherein: the electronic device goes from a normal mode to a full-buffer mode when the capacity of empty space in which received commands can be written and which is formed in the receive buffer after executing a command reaches a first reference value or less, and remains in the full-buffer mode until the capacity of the empty space increases to a second reference value that is greater than the first reference value, and while in the full-buffer mode, the received commands are cyclically written by the write control unit to an auxiliary space that is formed in the receive buffer, and real-time commands are detected in the order written from among the commands written to the auxiliary space, and the detected real-time commands are read and executed by the real-time command execution unit.

Even when the receive buffer is in a full-buffer state in which the empty storage space is less than or equal to a first reference value, the method according to this aspect of the invention cyclically writes and executes real-time commands from a limited area called an auxiliary space formed in an area in the same receive buffer by using addresses in a ring. As a result, the full-buffer state of the receive buffer can be eliminated while maintaining a state in which processes related to real-time commands can be continuously executed. More particularly, because the auxiliary space is an area created in the receive buffer, address management is simple and the processing time is shortened. The command management process is also simplified because managing commands in the auxiliary space after the full-buffer mode is enabled and managing commands before entering the full-buffer mode are part of the same continuous operation.

Another aspect of the invention is a computer-readable recording medium that records a program causing a computer to execute the steps of the electronic device control method of the invention.

By executing this program, even when the receive buffer is in a full-buffer state in which the empty storage space is less than or equal to a first reference value, this aspect of the invention enables cyclically writing and executing real-time commands from a limited area called an auxiliary space formed in an area in the same receive buffer by using addresses in a ring. As a result, the full-buffer state of the receive buffer can be eliminated while maintaining a state in which processes related to real-time commands can be continuously executed. More particularly, because the auxiliary space is an area created in the receive buffer, address management is simple and the processing time is shortened. The command management process is also simplified because managing commands in the auxiliary space after the full-buffer mode is enabled and managing commands before entering the full-buffer mode are part of the same continuous operation.

Effect of the Invention

The invention simplifies the command management process while maintaining a state in which real-time commands can be executed.

Other objects and attainments together with a fuller understanding of the invention will become apparent and appreciated by referring to the following description and claims taken in conjunction with the accompanying drawings.

BRIEF DESCRIPTION OF THE DRAWINGS

FIGS. 6A and 6B describe receive buffer states.

DESCRIPTION OF EMBODIMENTS

A preferred embodiment of the present invention is described below with reference to the accompanying figures.

Figure 1:
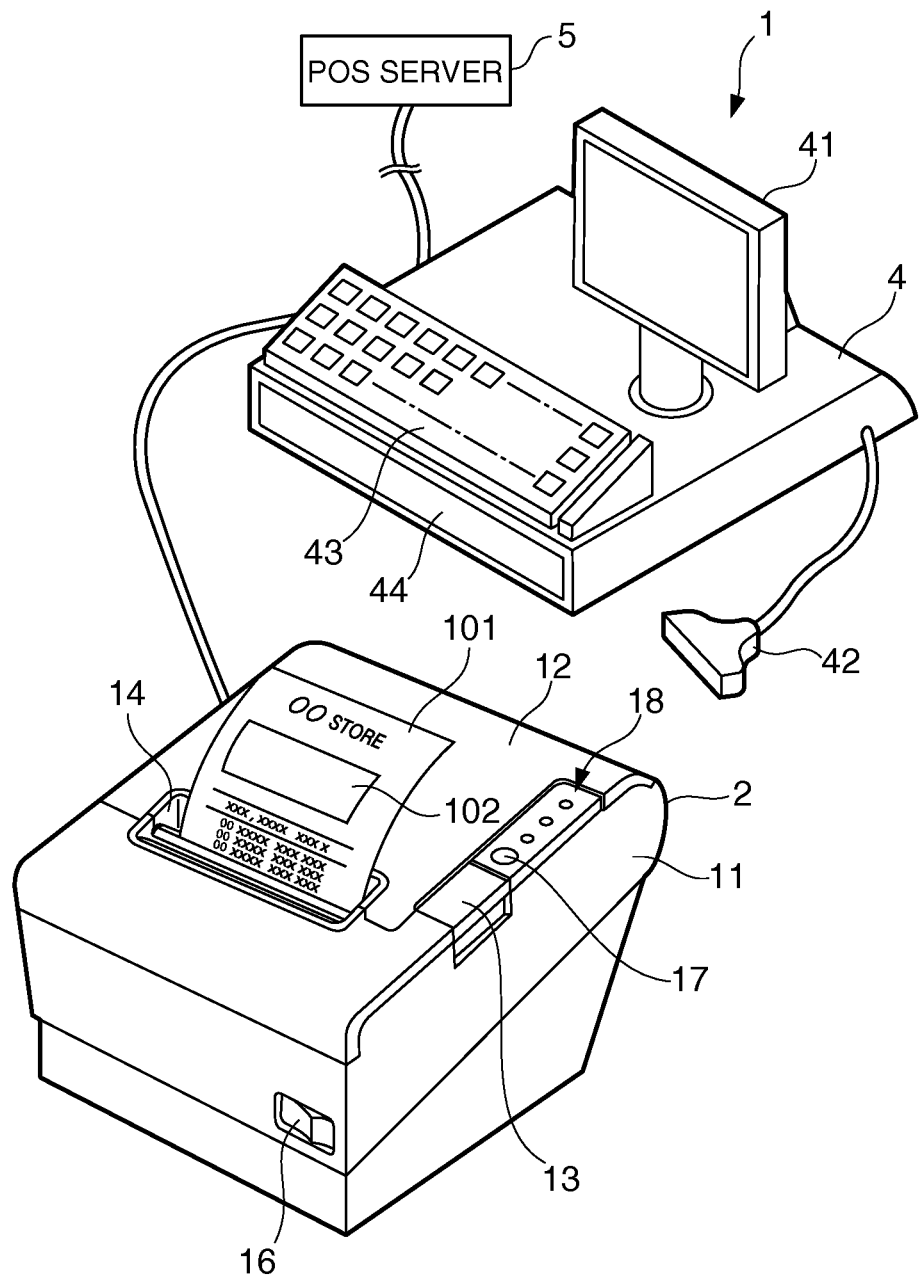
FIG. 1 shows the configuration of a POS terminal according to a preferred embodiment of the invention.

FIG. 1 shows the configuration of a POS terminal 1 according to this embodiment of the invention.

The POS terminal 1 is a register that is installed at a checkout counter in a retail store and runs a transaction process, for example, and is part of point-of-sale management system (POS system). The POS terminal 1 has a printer 2 that issues receipts 101 and is connected to a host computer 4 that manages sales processes and payment processes. The host computer 4 is connected through a communication line to a POS server 5 that collects sale and payment information.

The host computer 4 has a display 41 that displays the content of the sale and payment processes, a barcode scanner 42 that is used to read barcodes from the products during the sale process, a keyboard 43 having keys including a total key, and a cash drawer 44 that stores cash and other instruments used for payments. The cash drawer 44 is connected to the printer 2 as described below, and opens when a drawer open signal input from the printer 2 is received.

The printer 2 used as an electronic device in the embodiment of the invention stores thermal roll paper as a recording medium inside the printer case 11, prints (records) images on roll paper by means of a printhead, and outputs a receipt 101. The printer 2 includes a roller platen (not shown in the figure) that conveys the roll paper and a printhead disposed opposite the platen, and a paper cutter unit (not shown in the figure) that cuts the roll paper near the paper exit 14. The printhead of the printer 2 according to this embodiment of the invention is, for example, a line thermal head having heat elements (not shown in the figure) arrayed in one or more rows widthwise to the roll paper. The heat elements are individually energized by a print engine 20 described below, and cause the roll paper to change color by applying heat energy to the roll paper by means of the heat elements set in contact with the printing surface (recording surface) of the roll paper.

After printing with the printhead, the roll paper is conveyed to the outside from the paper exit 14 rendered in the top of the printer case 11, is cut by the cutter unit, and output as a receipt 101. Text and images denoting the store name, the names, quantities, and prices of the purchased products, the sale total, logos, and other information are printed on the receipt 101.

As shown in FIG. 1, a cover 12 that opens and closes is disposed to the case 11 of the printer 2. A lever 13 for opening the cover 12 is also disposed to the printer case 11, and when the cover 12 opens, a space for holding the roll paper is exposed, and roll paper can be added or replaced. Also disposed to the printer case 11 are a power switch 16 for turning the printer 2 power on and off; a paper feed switch 17 that tells the printer 2 to convey the roll paper or to switch the operating mode when specific control conditions are met; and an LED display unit 18 for displaying the operating status of the printer 2, for example.

The printer 2 drives a paper feed motor that rotates the platen roller and conveys the roll paper, a cutter drive motor that drives the cutter unit and cuts the roll paper, and the printhead to record text, images, or other markings on the roll paper.

Figure 2:
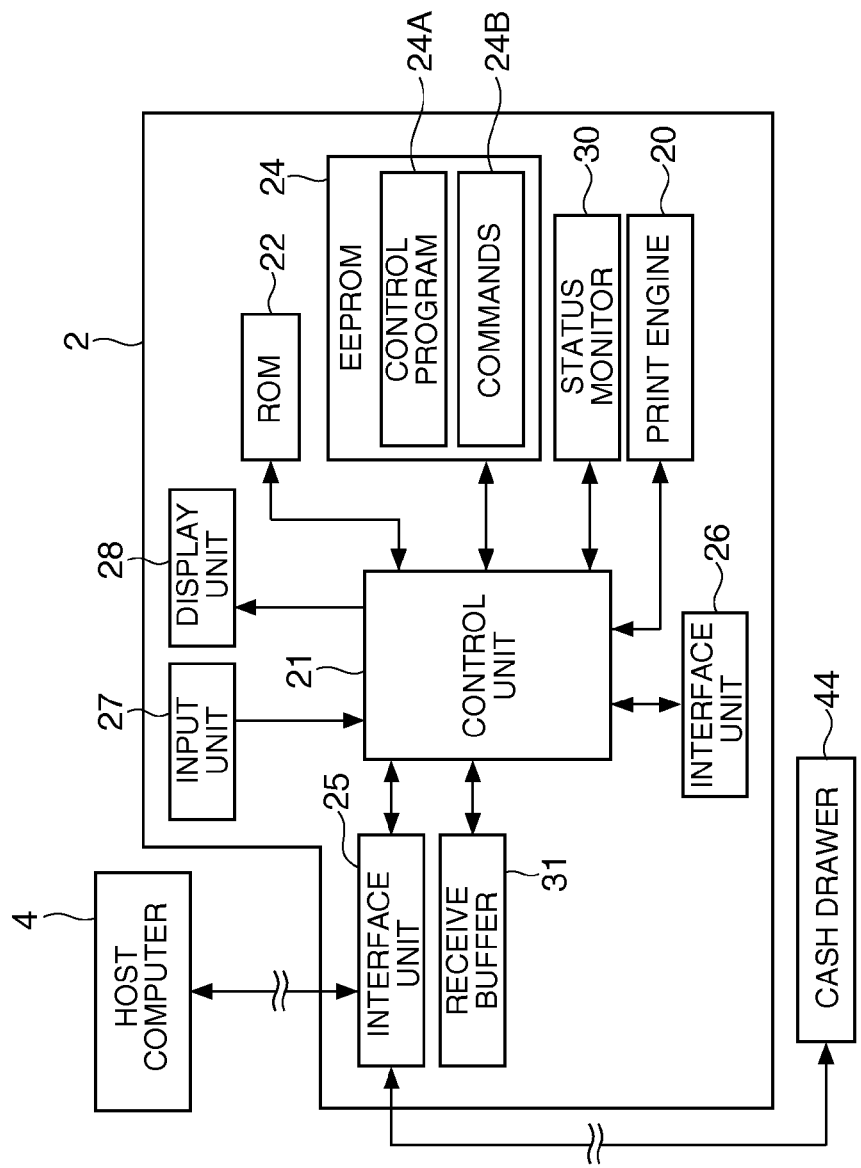
FIG. 2 is a block diagram showing the configuration of a printer.

FIG. 2 is a block diagram showing the circuit configuration of the printer 2.

The printer 2 includes a print engine 20 that does the actual printing; a control unit 21 that controls printer 2 operation; ROM 22 that stores the basic control program run by the control unit 21; EEPROM 24, which is nonvolatile memory, storing the control program 24A and commands 24B executed by the control unit 21; an interface unit 25 that handles data communication with the host computer 4 and cash drawer 44 as controlled by the control unit 21; an input unit 27 that detects operation of the paper feed switch 17 (FIG. 1); a display unit 28 that controls the LED display unit 18 and displays information; a status monitor 30 that monitors the operating status of various printer 2 parts; and a receive buffer 31 rendered by RAM as a ring buffer that cyclically temporarily stores data received from the host computer 4. A ring buffer sequentially stores data from the first address and after reaching the end address returns to the first address to continue storing data, and can thus efficiently use memory.

As controlled by the control unit 21 based on print data sent from the host computer 4, the print engine 20 creates the text or images to be printed on the roll paper as the recording medium, operates the printhead, cutter drive motor, and paper feed motor while monitoring the sensor output values including the paper edge sensor and remaining paper sensor, and prints on the roll paper.

The printer 2 thus has a printhead that applies ink or toner to the printing surface of a recording medium (roll paper, cut-sheet paper, or thermal paper, for example) made from paper or other synthetic material, or applies heat, to the printing surface of the recording medium, a printhead drive mechanism that moves the printhead relative to the recording medium, and the media conveyance mechanism to convey the recording medium, and controls the printhead and other parts by means of the print engine 20.

As controlled by the control unit 21, the print engine 20 operates the paper feed motor and conveys the roll paper a specific distance when operation of the paper feed switch 17 is detected by the input unit 27, and changes operation of the LEDs in the LED display unit 18 through the display unit 28 according to the operating status of the printer 2.

The control unit 21 includes a CPU and memory used as working area temporarily storing executed programs and data, and functions as a microprocessor. The control unit 21 executes the basic control program stored in ROM 22, and the control program 24A stored in EEPROM 24.

ROM 22 stores the basic control program for initializing the parts of the printer 2 and controlling various printer parts by means of the control unit 21, and nonvolatilely stores data associated with the basic control program.

EEPROM 24 is a rewritable nonvolatile storage device, and stores programs and data including control program 24A and commands 24B.

The interface unit 25 includes interfaces such as a USB interface and an RS-232C interface, and communicates wirelessly or by wire with the host computer 4 using a specific protocol as controlled by the control unit 21. The control unit 21 sequentially stores the data received from the host computer 4 through the interface unit 25 to the receive buffer 31.

The receive buffer 31 is a ring buffer that sequentially stores data received from the host computer 4 as controlled by the control unit 21. Commands and the print data following commands received from the host computer 4 are stored together in 64-bit blocks to the receive buffer 31.

Sensors or detection units for detecting the supply voltage of power externally supplied to the printer 2, the open or closed state of the cover 12, and if there is any roll paper, are connected to the status monitor 30 of the printer 2. Based on the values output from these detection units, the status monitor 30 outputs detection signals indicating specific events as interrupt signals to the control unit 21. The events detected and reported by the detection units include, for example, problems with the power supply voltage in the printer 2, if the printer 2 cover 12 that is opened and closed to add paper or replace the ink cartridge is open, if there is no paper in the printer 2, and operation of the paper feed switch 17.

The operating modes of the printer 2 include an on-line mode (normal mode) in which printing and communication with the host computer 4 are possible, and an off-line mode (full-buffer mode) in which only the minimum required operations can be executed.

When continuing the printing operation is unsuitable, the off-line mode is entered to stop the print mechanism including the printhead, limit command communication with the host computer 4, and protect the printer, communication data, and user safety. Entering the off-line mode is triggered by specific off-line events such as opening the cover 12 or running out of paper, and when the receive buffer 31 becomes full as described below. After entering the off-line mode, the control unit 21 returns the operating mode to the on-line mode when, for example, the status monitor 30 detects that the off-line event was resolved.

When the off-line mode is entered the control unit 21 reports that the off-line mode was enabled to the host computer 4. When the printer 2 is in the off-line mode, the host computer 4 temporarily stops outputting normal commands and outputs only real-time commands to the printer 2 as needed. Real-time commands are more urgent than normal commands and require immediate execution of a specific process.

The printer 2 according to this embodiment of the invention manages commands and simplifies the command management process so that processes called by real-time commands can always be executed when a real-time command is input even if the operating mode changed to the off-line mode (an off-line mode entered in this case is called a full-buffer mode in this embodiment of the invention) because the receive buffer 31 became full.

The command management process of a printer 2 according to this embodiment of the invention is described below.

Figure 3:
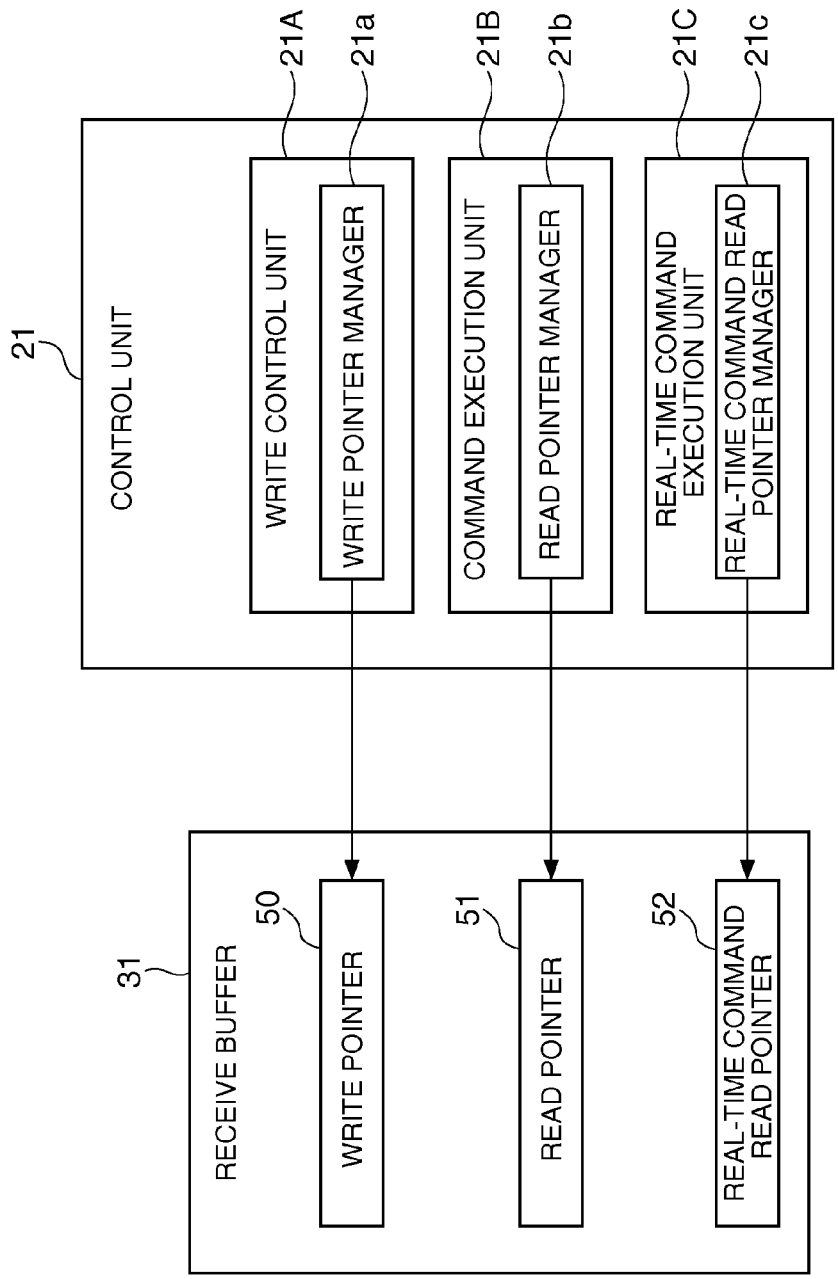
FIG. 3 shows the relationship between the printer and control unit and the receive buffer.

FIG. 3 is a block diagram showing the functional configuration of the control unit 21 of the printer 2.

Figure 4:
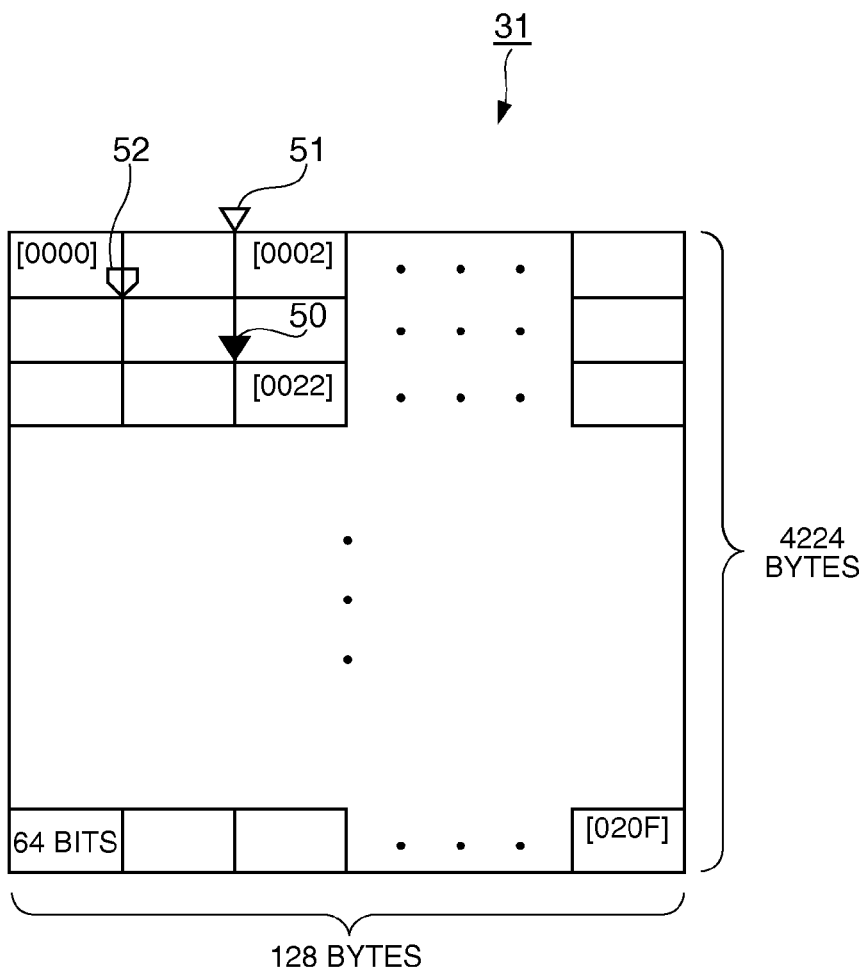
FIG. 4 describes the configuration of the receive buffer.

FIG. 4 schematically describes the structure of the receive buffer 31. Note that for convenience describing the invention, the structure of the receive buffer 31 shown in FIG. 4 is a structure suitable to describing the invention.

As shown in FIG. 4, the capacity of the receive buffer 31 in this embodiment of the invention is 4224 bytes. The storage area of the receive buffer 31 is divided into blocks that store one word each where one word is 64 bits, and an address is assigned to each storage block. Each of these areas for storing a word is called a "word block" below.

This receive buffer 31 is a ring buffer, and data is written cyclically in word block units.

As shown in FIG. 3, the control unit 21 has a write control unit 21A, command execution unit 21B, and real-time command execution unit 21C. The functions of these units are achieved by the cooperation of hardware and software, such as by a CPU executing the control program 24A stored in EEPROM 24.

The write control unit 21A has a write pointer manager 21a, and writes data received from the host computer 4 to word blocks according to the write pointer 50 managed by the write pointer manager 21a.

More specifically, a write pointer 50 is a pointer to the address of the particular word block in the receive buffer 31 where the received data is to be written.

When received data is written to the one word block corresponding to the address identified by the write pointer 50, the write pointer manager 21a repeatedly updates the address identified by the write pointer 50 to the address of the next word block after the one word block that was written, and manages the write pointer 50 so that the address identified by the write pointer 50 is always the address of the word block to which received data should be written. Note that if the first address in the receive buffer 31 is 0000 and the last address is 020F as shown in the example in FIG. 4, the next address indicated by the write pointer 50 after address 020F is 0000 because the receive buffer 31 is a ring buffer.

The write control unit 21A writes the data received from the host computer 4 to the word block corresponding to the address indicated by the write pointer 50. Referring to FIG. 4, for example, when the write pointer 50 is set to address 0022, the write control unit 21A writes the received data to the word block corresponding to address 0022.

To simplify the following description, the received data that is stored to the word blocks of the receive buffer 31 is data containing a command. More specifically, 64 bits of data including commands and data associated with the commands are stored in each word block without differentiating between commands and data.

The command execution unit 21B has a read pointer manager 21b, reads data from a word block according to the read pointer 51 managed by the read pointer manager 21b, and executes the process corresponding to the command contained in the data.

More specifically, a read pointer 51 is a pointer to the address of the particular word block in the receive buffer 31 from which data is to be read.

When received data is read from the one word block corresponding to the address indicated by the read pointer 51, the read pointer manager 21b repeatedly updates the address identified by the read pointer 51 to the address of the next word block after the one word block, and thus manages the read pointer 51 so that the address identified by the read pointer 51 is always the address of the word block from which received data should be read.

The command execution unit 21B reads the received data from the word block corresponding to the address indicated by the read pointer 51, and executes the process associated with the received data. For example, if the address identified by the read pointer 51 is 0002 in the example shown in FIG. 4, the command execution unit 21B reads the received data written to the word block corresponding to address 0002, and executes the process called by the command contained in the received data.

After executing a process the command execution unit 21B deletes the received data stored in that word block. Whether or not all received data written to a particular word block has been read could alternatively be managed with flags assigned to each word block. Empty space for storing the next received data can thus be created. This empty space moves cyclically through the receive buffer 31 as commands are executed. Empty space and auxiliary space that moves with the empty space as described below move cyclically through the receive buffer 31, that is, move as in a ring buffer.

In this embodiment of the invention the read pointer 51 moves following the write pointer 50 inside the receive buffer 31, and received data that has been received from the host computer 4 but has not been processed can therefore be read and the corresponding processes executed in the order received.

The real-time command execution unit 21C has a real-time command read pointer manager 21c, reads data containing a real-time command from a word block according to the real-time command read pointer 52 managed by the real-time command read pointer manager 21c, and executes the process corresponding to the real-time command.

More specifically, a real-time command read pointer 52 is a pointer to the address of the particular word block in the receive buffer 31 from which data containing a real-time command is to be read.

After received data containing a real-time command written to one word block is read and executed, the real-time command read pointer manager 21c analyzes the content of the received data written to each word block in sequence from the one word block to the word block corresponding to the address identified by the write pointer 50. If the real-time command read pointer manager 21c finds a word block to which received data containing a real-time command was written, it updates the address indicated by the real-time command read pointer 52 to the address of that word block. When the real-time command read pointer manager 21c detects a word block to which received data containing a real-time command was written, the real-time command execution unit 21C reads the received data written to the word block corresponding to the address identified by the real-time command read pointer 52, and immediately and unconditionally executes the process called by the real-time command contained in the received data as an interrupt process.

After executing the process, the command execution unit 21B deletes the received data written to that word block.

Note that real-time commands include, for example, status request commands instructing the printer to return a status report, a clear buffer command instructing clearing the receive buffer 31, and a drawer open command for opening the cash drawer 44. The printer 2 executes such real-time commands with priority over other commands and processes to, for example, return a status report.

Figure 5:
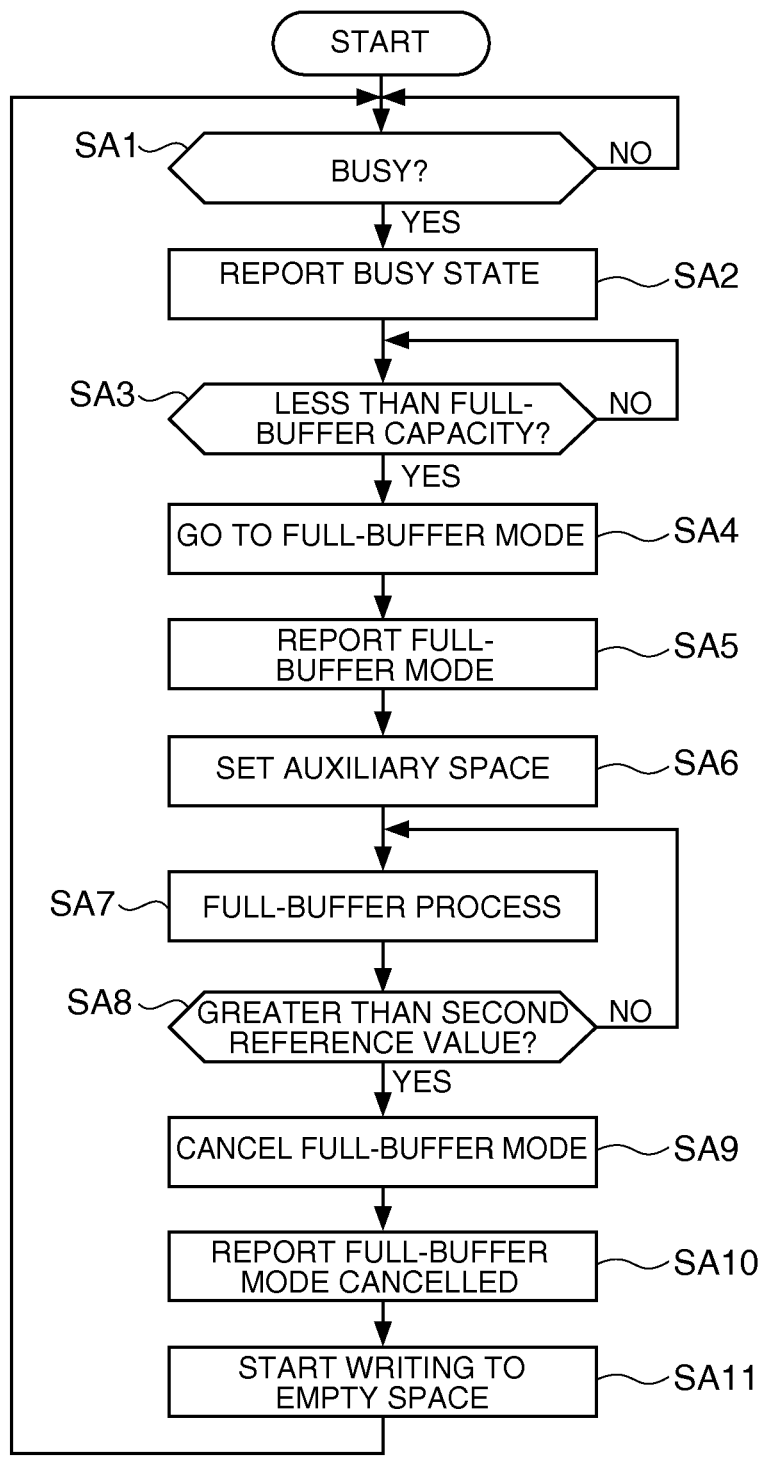
FIG. 5 is a flow chart of printer operation.

FIG. 5 is a flow chart of the operation of the printer 2 according to this embodiment of the invention.

When the operation shown in the flow chart in FIG. 5 starts, reading and writing normal data, that is, data other than real-time commands, in receive buffer 31 is in progress.

The control unit 21 of the printer 2 monitors whether the receive buffer 31 is busy or not (step SA1).

FIG. 6A describes the operation in step SA1.

A busy state is a state in which the available (empty) storage capacity in the receive buffer 31 is less than or equal to 256 bytes, which is defined as the busy state capacity.

The available storage capacity of the receive buffer 31 is that part of the write area of the receive buffer 31 not including the part where received data that has not been executed (also referred to herein as "unexecuted data") is written. More specifically, the available storage capacity is the area not including the area between the read pointer 51 and the write pointer 50 (that is, the area where unexecuted data is written as indicated by the shaded area in FIG. 6A). A busy state is a state in which the available storage capacity is small in relation to the total storage capacity of the receive buffer 31.

If the receive buffer 31 is busy (step SA1 returns Yes), the control unit 21 reports that the receive buffer 31 is busy to the host computer 4 (step SA2). This report enables the host computer 4 to know that the receive buffer 31 is busy and execute an operation that is predefined as the operation to perform when the receive buffer 31 is busy. This operation could involve, for example, reducing the data output rate to the printer 2, outputting only data related to a predetermined specific command to the printer 2, or displaying a message indicating that the receive buffer 31 is busy on the display 41. Note that while not shown in the figures, the control unit 21 reports to the host computer 4 when the available storage capacity of the receive buffer 31 exceeds the busy state capacity without going below the full-buffer capacity (128 bytes) described below.

The control unit 21 then monitors if the available storage capacity of the receive buffer 31 reaches or goes below the 128 bytes that is defined as the full-buffer capacity (step SA3). This full-buffer capacity is a first reference value.

When the available storage capacity of the receive buffer 31 goes to or below the full-buffer capacity (step SA3 returns Yes), the control unit 21 changes the operating mode from the normal operating mode to the full-buffer mode (step SA4), and reports to the host computer 4 that the operating mode changed to the full-buffer mode (step SA5).

This full-buffer mode is one type of off-line mode, and in order to preserve the received data and end the full-buffer state (described below), stops command execution, temporarily stops the print mechanism, and limits the exchange of commands between the printer 2 and host computer 4.

When the host computer 4 learns from the report received in step SA5 that the operating mode changed to the full-buffer mode, it executes an operation appropriate to the off-line mode. More specifically, the commands output from the host computer 4 to the printer 2 are limited to real-time commands. The host computer 4 basically outputs only real-time commands to the printer 2. Note that after the printer 2 enters the full-buffer mode, execution of operations corresponding to commands other than real-time commands output from the host computer 4 to the printer 2 is not assured.

The control unit 21 then reserves auxiliary space (step SA6).

FIG. 6B describes this auxiliary space.

Of the 4224 byte storage capacity of the receive buffer 31 in this embodiment of the invention, a 4096 byte area is reserved as the normal write area where received data is written during normal operation, and when this normal write area becomes full, the remaining 126-byte area is reserved for use as a auxiliary space. More specifically, this auxiliary space is always reserved in addition to the normal write area.

Note that when the normal write area that is normally used becomes full, the receive buffer 31 is in a full-buffer state in this embodiment of the invention. This is because the auxiliary space is reserved for auxiliary use when needed, and the normal write area being full is effectively the same as a buffer area that does not include the auxiliary space being full.

As further described below, when the available storage capacity of the receive buffer 31 drops to the 126 bytes of the auxiliary space, the 4096-byte area corresponding to the normal write area portion of the full 4224-byte storage capacity is full. The 126-byte empty storage capacity left in the storage area of the receive buffer 31 when the normal write area becomes full functions as the auxiliary space.

In step SA6, the control unit 21 gets the start address ("auxiliary space start address" below) and the end address ("auxiliary space end address" below) of the auxiliary space, that is, the beginning and end addresses of the empty storage space when the available storage capacity drops to 126 bytes.

The control unit 21 then executes the buffer full process (step SA7).

Figure 7A:
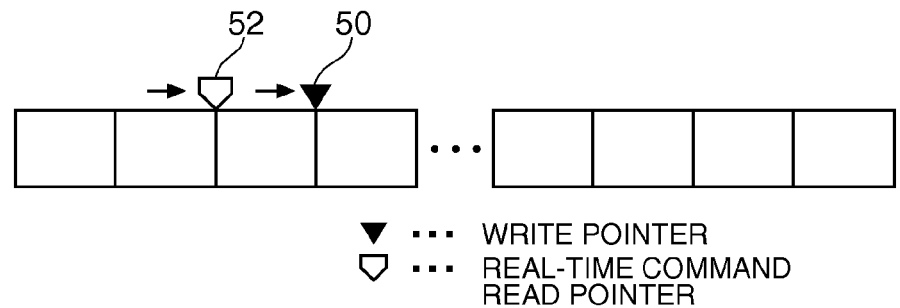
FIGS. 7A-7C describe using the auxiliary storage area.
Figure 7B:
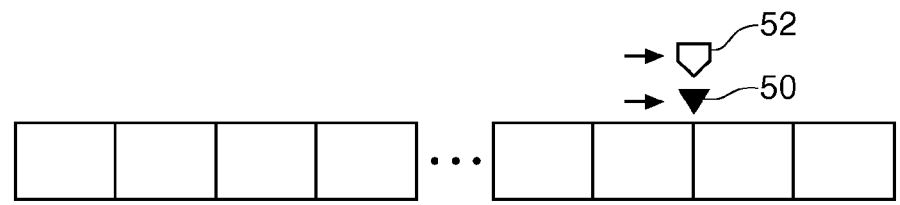
Figure 7C:
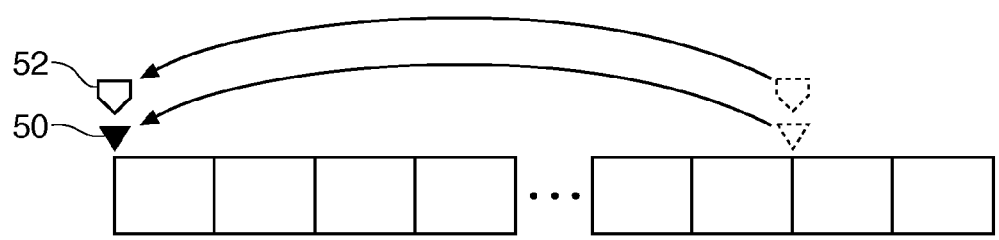

FIGS. 7A-7C describe operation in the buffer full process.

A buffer full process is a process that writes, reads, and executes received data based on the received data input from the host computer 4. More specifically, in the buffer full process received data is written only to the auxiliary space, only received data related to real-time commands is read from the received data written to the auxiliary space, and the process corresponding to the real-time command is executed.

Note that the auxiliary space functions as a single ring buffer, and received data is written cyclically to the auxiliary space.

As described in detail below, as received data is input and the input received data is written, the write pointer manager 21a sequentially updates the address from the first word block indicated by the write pointer 50 in the group of word blocks contained in the auxiliary space.

In order to write data from the first word block in the auxiliary space after entering the full-buffer mode, the write pointer 50 must be pointing to the address of the first word block in the auxiliary space. In this embodiment of the invention the normal write area and the auxiliary space are formed continuously in a single receive buffer 31. As a result, when entering the full-buffer mode, that is, after writing the received data to the last word block in the normal write area, the address indicated by the write pointer 50 is updated from the address of the last word block in the normal write area to the address of the next word block (=the address of the first word block in the auxiliary space) in the same way as during the normal operating mode. As a result, the address indicated by the write pointer 50 when the full-buffer mode is enabled is the address of the first word block in the auxiliary space.

The write pointer 50 management process is thus simple because there is no need to use a process different from the normal process to update the address indicated by the write pointer 50 when the full-buffer mode is enabled. For example, management of the write pointer 50 in this embodiment of the invention is significantly easier than in a configuration that has two buffers, uses the other reserved buffer when one buffer becomes full, and therefore must manage the write pointer for the other buffer separately from the write pointer for the one buffer.

In the full-buffer process, the real-time command read pointer manager 21c updates the address indicated by the real-time command read pointer 52 sequentially from the first word block in the group of word blocks contained in the auxiliary space according to the read data contained in the real-time command. As the real-time command read pointer 52 moves, the real-time command execution unit 21C sequentially executes processes based on the real-time commands.

The real-time command read pointer 52 follows the write pointer 50 in the auxiliary space while in the full-buffer mode. As a result, processes called by a real-time command requiring an urgent response that are sent from the host computer 4 are sequentially executed with priority over other commands even while in the full-buffer mode, even if the printer is off-line, for example.

In this embodiment of the invention the write pointer 50 and the real-time command read pointer 52 are managed to move through the auxiliary space as described below. Note that updating the address indicated by a pointer is also referred to herein as moving the pointer.

Referring to FIG. 7A, parts of the control unit 21 move the real-time command read pointer 52 and the write pointer 50 so that the real-time command read pointer 52 follows the write pointer 50, and processes corresponding to the real-time commands are executed in the order received.

As shown in FIG. 7B, when the write pointer 50 and real-time command read pointer 52 point to the same place, that is, when the address indicated by the write pointer 50 and the address indicated by the real-time command read pointer 52 are the same, the parts of the control unit 21 move both the write pointer 50 and real-time command read pointer 52 to the position corresponding to the first word block in the auxiliary space, and then start moving the pointers from the beginning of the auxiliary space as shown in FIG. 7C.

Note that when the write pointer 50 returns to the beginning of the auxiliary space, the received data is again sequentially written from the first word block in the auxiliary space, and any word blocks storing data containing normal commands that have not been executed are overwritten.

By thus moving the write pointer 50 and real-time command read pointer 52, movement of these pointers has always already started from the beginning of the auxiliary space if the position of the write pointer 50 and the position of the real-time command read pointer 52 are the same. Managing the pointers is therefore simple compared with a configuration in which the pointers move completely independently of each other. The pointers can therefore be prevented to some extent from moving from the last word block in the auxiliary space to the first word block, and pointer management is further simplified.

Note that data containing normal commands is overwritten and erased without being read in the full-buffer process, but because it is not assured when enabling the full-buffer mode that processes related to normal commands will be executed, the host computer 4 outputs normal commands to the printer 2 based on this condition, and problems do not result from not executing processes related to normal commands.

The effect of this full-buffer process is described below.

The full-buffer process takes advantage of the full-buffer mode characteristic that the operation of processes corresponding to normal commands is not assured between the printer 2 and the host computer 4, and normal commands do not need to be executed. As a result, the limited available storage capacity of the auxiliary space can be used to reliably execute processes related to real-time commands while assuring time to reserve sufficient empty storage space to enable returning from the full-buffer mode to the normal operating mode.

More specifically, because the auxiliary space is formed contiguously to the normal write area of a single receive buffer 31 when executing the full-buffer process, pointer management, and particularly command management, is simple.

While executing a full-buffer process, the control unit 21 watches if a second reference value, which is defined as a threshold value for canceling the full-buffer mode, exceeds the available storage capacity (step SA8). Because this second reference value is a value for determining whether or not to cancel the full-buffer mode, it is at least greater than the full-buffer capacity (first reference value) described above.

If the available storage capacity is greater than or equal to the second reference value (step SA8 returns Yes), the control unit 21 cancels the full-buffer mode, returns the operating mode to the normal mode (step SA9), and reports this to the host computer 4 (step SA10). Triggered by this report, the host computer 4 starts outputting normal commands to the printer 2 as usual.

Next, the control unit 21 starts writing the received data to the empty storage space (step SA11).

Figure 8:
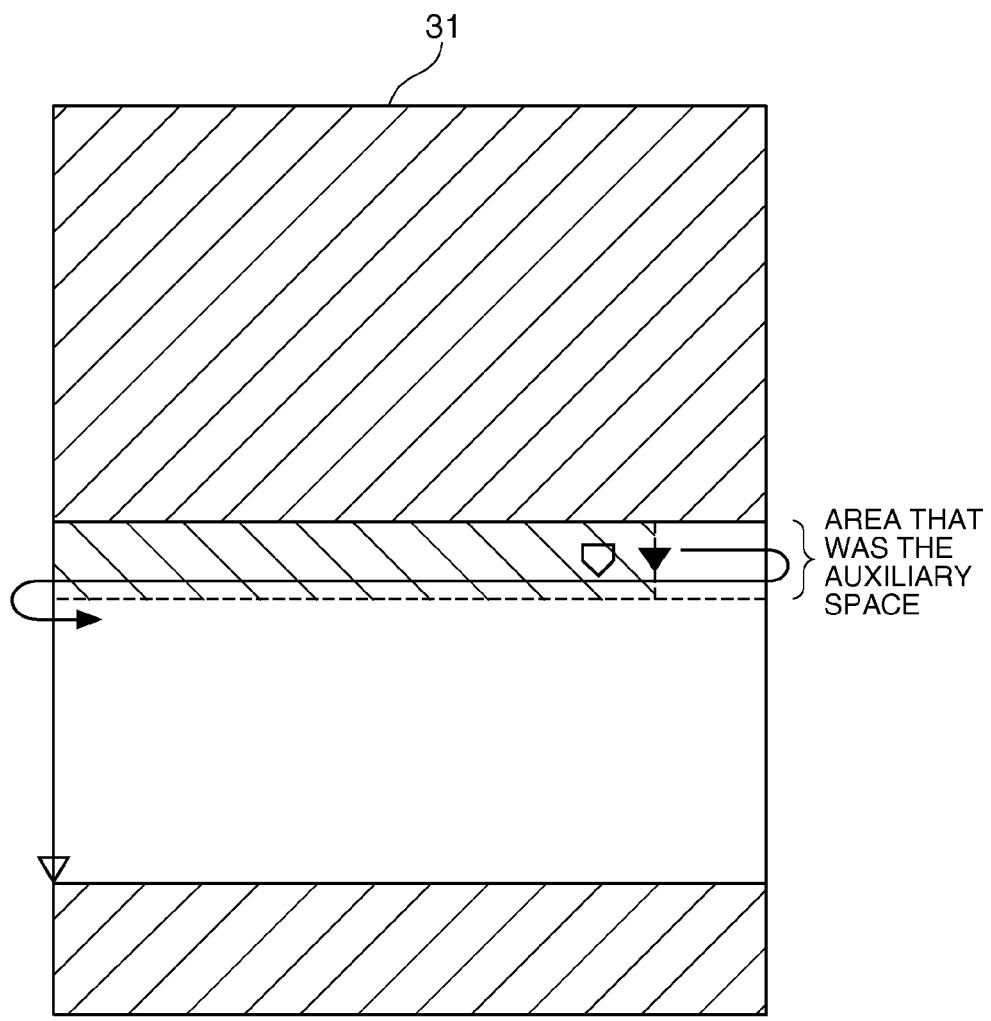
FIG. 8 schematically describes receive buffer states.

FIG. 8 describes the process executed in step SA11.

As shown in FIG. 8, when the full-buffer mode is cancelled because the available storage capacity equals or exceeds the second reference value, the empty storage area is the area contiguous to the area that functioned as the auxiliary space. Therefore, when the full-buffer mode is cancelled, the write pointer 50 and real-time command read pointer 52 can start moving according to the normal management procedure from their locations when the full-buffer mode was cancelled. As a result, received data can be sequentially written in the order received to the empty storage space as the pointers move, and processes related to real-time commands can be sequentially executed.

As described above, because an auxiliary space is formed in the receive buffer 31 and an empty storage space contiguous to the area used as the auxiliary space is formed when the full-buffer mode is cancelled, managing the write pointer 50 and real-time command read pointer 52, that is, managing commands, is simplified when the full-buffer mode is cancelled, and a special process is not needed to move and manage the pointers.

As described above, a printer 2 described as an example of an electronic device according to this embodiment of the invention has a write control unit 21A, command execution unit 21B, and real-time command execution unit 21C, and when the empty storage capacity in the receive buffer 31 drops to or below a full-buffer capacity, enters a full-buffer mode until the empty storage capacity equals or exceeds a second reference value, which is greater than the full-buffer capacity. While in the full-buffer mode, the write control unit 21A cyclically writes received commands to an auxiliary space formed in the receive buffer 31, and the real-time command execution unit 21C reads and executes only the real-time commands contained in the received commands written to the auxiliary space.

As a result, even if the receive buffer 31 is in a state in which the available storage capacity is less than the full-buffer capacity, a state in which real-time command processes continue executing can be maintained and the full-buffer state of the receive buffer 31 can be resolved by cyclically writing real-time commands to the limited capacity of the auxiliary space formed in the same receive buffer 31. More specifically, because the auxiliary space is an area formed in the receive buffer 31, managing received commands in the auxiliary space after entering the full-buffer mode can continue in unison with managing received commands before entering the full-buffer mode, and the process related to managing received commands is simplified.

When the full-buffer mode is cancelled in this embodiment of the invention, the write control unit 21A stops cyclically writing received commands to the auxiliary space, and starts writing commands to empty space.

In this embodiment the available storage capacity is greater than or equal to a second reference value, and when the full-buffer mode is cancelled, the normal writing process using the receive buffer 31 can begin immediately. More particularly, because the auxiliary space is an area formed in the receive buffer 31, managing normal received commands using the receive buffer 31 after the full-buffer mode is cancelled can continue in unison with managing received commands while in the full-buffer mode, and the process related to managing received commands is simplified. More specifically, when the full-buffer mode is cancelled because the capacity of the empty storage space is greater than the second reference value, the empty storage space is contiguous to the storage space that functioned as the auxiliary space. Therefore, when the full-buffer mode is cancelled, the write pointer 50 and real-time command read pointer 52 can start moving in the same way as in the normal operating mode from their positions when the full-buffer mode was cancelled. As a result, received data can be sequentially written in the order received to the empty storage space as the pointers move, and processes related to real-time commands can be executed immediately.

If the position of the write pointer 50 and the position of the real-time command read pointer 52 are the same as a result of moving the write pointer 50 and real-time command read pointer 52 in the auxiliary space when executing a full-buffer process, moving these pointers always starts from the beginning of the auxiliary space. Managing the pointers is therefore easier than when the pointers move completely independently of each other. In addition, moving the pointers from the last word block to the first word block of the auxiliary space can be prevented, and pointer management is simple.

In this embodiment of the invention the auxiliary space is an area of a capacity corresponding to the full-buffer capacity, which corresponds to the empty storage space formed in the receive buffer 31 when the full-buffer mode is enabled.

This enables using empty space to reserve an area corresponding to the auxiliary space in the receive buffer 31.

This embodiment of the invention also enables reporting to the host computer 4 when the full-buffer mode is enabled.

As a result, the host computer 4 can know that the full-buffer mode is enabled, and as a result can execute a process corresponding to the full-buffer mode, such as limiting output of commands.

A preferred embodiment of the invention is described above, but the invention is not so limited. The function units shown in FIG. 2 and FIG. 3 can be desirably achieved by the cooperation of hardware and software, and do not suggest any specific hardware configuration.

In addition, the embodiment described above applies the invention to a printer 2 that prints receipts 101 in a POS terminal 1 application, but the invention is not so limited. For example, a configuration in which the host computer 4 is connected through a communication means of some kind to a printer that functions independently is also conceivable. For example, a plurality of host computers 4 could be connected to a printer 2 through a LAN.

Furthermore, a configuration in which the printer 2 has a control unit 21 and a receive buffer 31 is described in the foregoing embodiment, but a control device having a control unit 21 and receive buffer 31 could be externally connected as a separate device to the printer 2.

Furthermore, the recording device to which the invention can be applied is not particularly limited, and can be any type of printer that operates according to commands, including an inkjet printer, dot impact printer, laser printer, or dye sublimation printer. The printer could also form markings including text and images using other methods, and could be a printer incorporated in another device. A device that records to electronic media is also conceivable.

A program according to the invention could also be included in a printer driver installed in the host computer 4.

A program for executing the steps of the flow chart shown in FIG. 5 could be stored on a storage medium inside the printer 2, or could be read from an external storage medium of the printer 2 and executed by the control unit 21.

The invention being thus described, it will be obvious that it may be varied in many ways. Such variations are not to be regarded as a departure from the spirit and scope of the invention, and all such modifications as would be obvious to one skilled in the art are intended to be included within the scope of the following claims.

What is claimed is:

1. An electronic device comprising:
a write control unit that cyclically writes commands received from a host computer in the order received to a receive buffer;
a command execution unit that reads and executes commands written to the receive buffer in the order written; and
a real-time command execution unit that detects real-time commands in the order written from among commands written to the receive buffer, and sequentially reads and executes detected real-time commands;
wherein the electronic device goes from a normal mode to a full-buffer mode when the capacity of empty space in which received commands can be written and which is formed in the receive buffer after executing a command reaches a first reference value or less, and remains in the full-buffer mode until the capacity of the empty space increases to a second reference value that is greater than the first reference value, and
while in the full-buffer mode, the write control unit cyclically writes the received commands to an auxiliary space that is formed in the receive buffer, and
the real-time command execution unit detects real-time commands in the order written from among the commands written to the auxiliary space, and reads and executes the detected real-time commands.

2. The electronic device described in claim 1, wherein:
the write control unit stops cyclically writing commands to the auxiliary space and starts writing the received commands to the empty space when the normal mode is resumed from the full-buffer mode because the empty space capacity increased to the second reference value or more.

3. The electronic device described in claim 2, wherein:
when in the full-buffer mode,
the write control unit writes the received commands to the area indicated by a write pointer while moving the write pointer in the auxiliary space,
the real-time command execution unit detects an area where a real-time command was written and reads and executes the detected real-time command while moving a real-time command read pointer in the auxiliary space, and
when the write pointer and the real-time command read pointer point to the same area, the write control unit moves the write pointer to the beginning of the auxiliary space, and the real-time command execution unit moves the real-time command read pointer to the beginning of the auxiliary space.

4. The electronic device described in claim 3, further comprising:

an interface unit;

wherein when the full-buffer mode is enabled, the interface unit reports to the host computer that the full-buffer mode was enabled, and the command execution unit stops reading and executing the received commands.

5. The electronic device described in claim 2, further comprising:

an interface unit;

wherein when the full-buffer mode is enabled, the interface unit reports to the host computer that the full-buffer mode was enabled, and the command execution unit stops reading and executing the received commands.

6. The electronic device described in claim 1, wherein:

the auxiliary space moves cyclically in the receive buffer as commands are executed, is an area of a capacity corresponding to empty space formed in the receive buffer when entering the full-buffer mode, and is an area of a capacity corresponding to the first reference value.

7. The electronic device described in claim 6, further comprising:

an interface unit;

wherein when the full-buffer mode is enabled, the interface unit reports to the host computer that the full-buffer mode was enabled, and the command execution unit stops reading and executing the received commands.

8. The electronic device described in claim 1, further comprising:

an interface unit;

wherein when the full-buffer mode is enabled, the interface unit reports to the host computer that the full-buffer mode was enabled, and the command execution unit stops reading and executing the received commands.

9. A control method for an electronic device having a write control unit that cyclically writes commands received from a host computer in the order received to a receive buffer, a command execution unit that reads and executes commands written to the receive buffer in the order written, and a real-time command execution unit that detects real-time commands in the order written from among commands written to the receive buffer, and sequentially reads and executes detected real-time commands, wherein:

the electronic device goes from a normal mode to a full-buffer mode when the capacity of empty space in which received commands can be written and which is formed in the receive buffer after executing a command reaches a first reference value or less, and remains in the full-buffer mode until the capacity of the empty space increases to a second reference value that is greater than the first reference value, and while in the full-buffer mode, the received commands are cyclically written by the write control unit to an auxiliary space that is formed in the receive buffer, and real-time commands are detected in the order written from among the commands written to the auxiliary space, and the detected real-time commands are read and executed by the real-time command execution unit.

10. The control method for an electronic device described in claim 9, wherein:

when the normal mode is resumed from the full-buffer mode because the empty space capacity increased to the second reference value or more, cyclically writing commands to the auxiliary space by the write control unit stops and writing the received commands to the empty space starts.

11. A non-transitory computer-readable recording medium that records a program causing a computer to execute the steps of the electronic device control method described in claim 10.

12. The control method for an electronic device described in claim 9, wherein:

when in the full-buffer mode, the received commands are written to the area indicated by a write pointer while the write pointer is moved in the auxiliary space by the write control unit, an area where a real-time command was written is detected and the detected real-time command is read and executed by the real-time command execution unit while moving a real-time command read pointer in the auxiliary space, and when the write pointer and the real-time command read pointer point to the same area, the write pointer is moved to the beginning of the auxiliary space by the write control unit, and the real-time command read pointer is moved to the beginning of the auxiliary space by the real-time command execution unit.

13. A non-transitory computer-readable recording medium that records a program causing a computer to execute the steps of the electronic device control method described in claim 12.

14. A non-transitory computer-readable recording medium that records a program causing a computer to execute the steps of the electronic device control method described in claim 9.

* * * * *